H. H. COOPER.
COUNTERSINK DRILL CHUCK.
APPLICATION FILED NOV. 23, 1917.
1,294,054.
Patented Feb. 11, 1919.
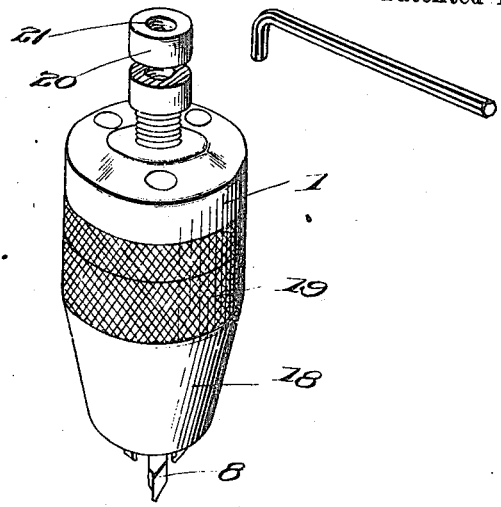
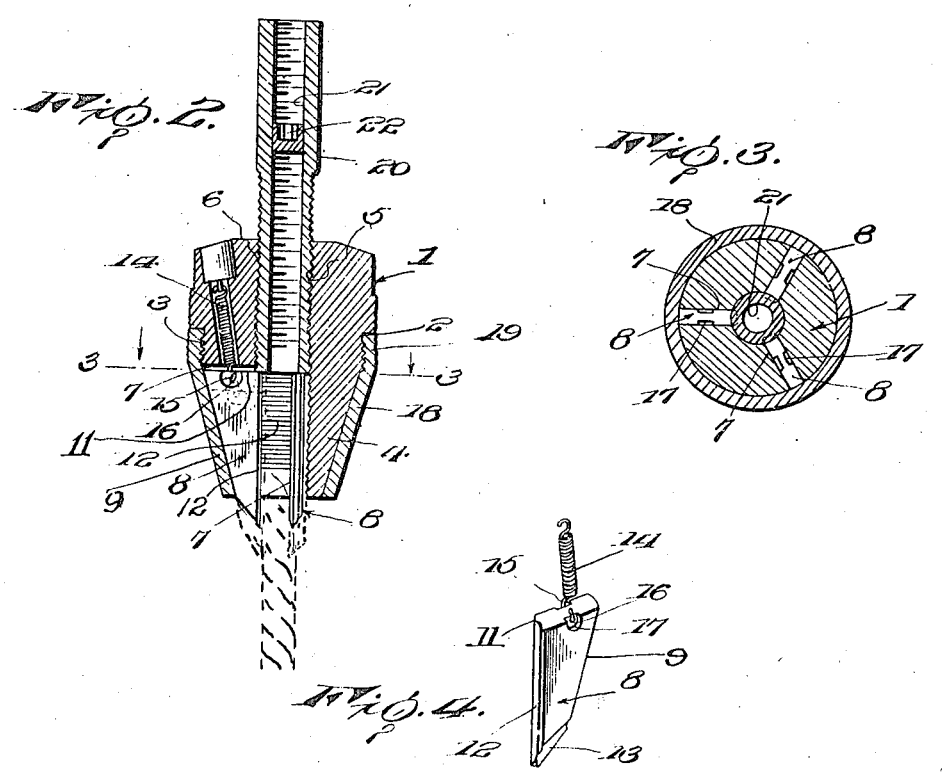
INVENTOR:-
Hugh H. Cooper.
By
Attorney.

UNITED STATES PATENT OFFICE.

HUGH H. COOPER, OF TROY, NEW YORK.

COUNTERSINK DRILL-CHUCK.

1,294,054.　　　Specification of Letters Patent.　　Patented Feb. 11, 1919.

Application filed November 23, 1917.　Serial No. 203,559.

*To all whom it may concern:*

Be it known that I, HUGH H. COOPER, a citizen of the United States, residing at Troy, in the county of Rensselaer and State of New York, have invented certain new and useful Improvements in Countersink Drill-Chucks, of which the following is a specification.

This invention relates to an improvement in countersink drill chucks, wherein provision is made for the coöperation with drills of any and all sizes within the maximum limit of the drill bore of the chuck.

Drill chucks of this character have heretofore been constructed for coöperation with a drill commensurate with the size of the bore of the chuck, due largely to the movement of the gripping jaws in a lateral direction only, so that the jaws could only operate throughout a very limited distance without changing their angular relation, and hence destroying the gripping operation. This has necessitated a drill chuck of this character for each size drill.

The present invention provides the gripping jaws for movement longitudinally of the chuck block and against a conical surface, so that the jaws move in parallel relation toward each other from the maximum bore diameter to direct contact, thus permitting the use of any drill of or less diameter than that of the chuck bore to be effectively gripped.

The gripping operation of the jaws is secured by their longitudinal movement, and the present invention also contemplates a means whereby the jaws are automatically moved in the opposite or release direction, upon proper manual operation of the setting means.

The invention in the preferred form is illustrated in the accompanying drawings, in which:—

Figure 1 is a perspective view of the completed chuck.

Fig. 2 is a central longitudinal section of the same.

Fig. 3 is a transverse section on the line 3—3 of Fig. 2.

Fig. 4 is a detail, showing the spring connection of the gripping jaws in the chuck block.

The improved countersink drill chuck is here shown as comprising a chuck block 1, of cylindrical form for a portion of its length, in advance of which portion it is reduced, as at 2, and exteriorly threaded, as at 3. In advance of the portion 2, the block is cone shaped, as at 4, constituting what may be termed the head. The block is axially bored at 5, the wall of this bore being threaded at 6 for the greater portion of its length.

The wall of the head 4 is slotted at 7 throughout its length, three such slots being here shown of equal circumferential spacing. These slots form the guideways for the gripping jaws 8, there being one such jaw mounted in each slot 7. These jaws constitute the gripping means for securing the drill in place in the chuck, and also the means for cutting or forming the countersink. Each jaw 8 is longitudinally tapered and decreases in width forwardly. Each jaw has an inner straight edge 12, an outer inclined edge 9, and an upper shoulder 11. The shoulder 11 is disposed at a right angle to the inner edge 12 and this shoulder projects inwardly beyond the bore 5, as shown. The inner edge 12 is formed to grip the drill, as indicated. The free end of the jaw is formed in any well known or desired manner for countersinking, as at 13.

An important feature of the present invention is the connection of the individual jaws to the block, so that the longitudinal movement of such jaws may be provided for, and also the automatic return or release movement of such jaws when possible. This result is secured by connecting each jaw to the block through a coiled spring 14, one end of which is anchored in a recess in the base of the slot 7, which the opposite end is formed into a loop 15, to be passed through an opening 16 in the end of the jaw. The surface of the jaw on each side and adjacent the connection of the spring thereto, is cut out at 17 to facilitate the connection or disconnection of the spring, and avoid projection at this point. The springs are coiled in the direction of the length of the jaw, so that any longitudinal movement of such jaw will be against the tension of the spring, causing the spring to automatically return the jaw to normal position, when free to act.

A sleeve 18 is arranged to fit over the head 4 of the block, being interiorly shaped to more or less snugly embrace the cone shaped portion thereof, the sleeve having a cylindrical portion 19, interiorly threaded to engage the threads 3 of the reduced cylindrical portion of the block.

A cylindrical chuck shank 20 is formed and threaded for engagement with the bore 5 of the block, the free end of the shank being otherwise formed to engage the boring machine connection. The shank 20 is also longitudinally bored at 21, and threaded throughout the length of such bore to receive a gage plug 22, preferably having a socket end, as shown, through which it may be adjusted. The drill fits within the bore of the shank 20, and the rear end of the drill is adapted to contact with the gage plug 22.

With the parts assembled, the drill is inserted between the jaws, and the shank 20 screwed inwardly. This causes the inner end of the shank to bear against the projecting edges 11 of the jaws and force the jaws longitudinally of the block. As the outer surfaces of the jaws are moving against the cone shaped surface of the sleeve 18, this longitudinal movement moves the jaws toward each other to grip the drill. The plug 22 is then screwed inwardly until the end of the drill is engaged, when the parts are set for use. The shank reinforces the drill against side strain while the plug resists end strain.

In releasing the drill, the reverse movement of the shank, permits the jaws to move in a corresponding direction under the pull of the springs, thus spreading or opening the jaws.

The connection of the jaws to the block permits the ready separation of the jaws from the block, when sharpening or renewal is required. The jaws in their clamping movement move in right lines, that is with their inner or gripping edges always parallel, so that such jaws may be caused to grip a drill from the smallest size to one approximately equal to the bore of the block.

What is claimed is:—

A countersink drill chuck, comprising a tapered body portion having a central longitudinal bore and radial slots and longitudinal openings disposed above the slots, said openings being substantially parallel with the tapered portion of the body, jaws mounted in the radial slots, the outer edges of the jaws being tapered to engage the tapered portion of the body and their inner edges at all times projecting into the bore, coil springs anchored within the openings and attached to the upper ends of the jaws, and means operated in the longitudinal bore to engage the upper inner surfaces of the jaws to cause said jaws to ride on the tapered portion of the body in opposition to the springs.

In testimony whereof I affix my signature in the presence of two witnesses.

HUGH H. COOPER.

Witnesses:
JAMES M. PRYOR,
CHAS. ZIPFEL.